US 10,072,562 B2
Sep. 11, 2018

(12) United States Patent
Hunter et al.

(54) ENGINE TURBO-COMPOUNDING SYSTEM

(71) Applicant: AVL Powertrain Engineering, Inc., Plymouth, MI (US)

(72) Inventors: Gary L. Hunter, Brighton, MI (US); Gustav R. Johnson, Canton, MI (US)

(73) Assignee: AVL POWERTRAIN ENGINEERING, INC., Plymouth, MI (US)

(*) Notice: Subject to any disclaimer, the term of this patent is extended or adjusted under 35 U.S.C. 154(b) by 166 days.

(21) Appl. No.: 15/050,877

(22) Filed: Feb. 23, 2016

(65) Prior Publication Data
US 2016/0252009 A1 Sep. 1, 2016

Related U.S. Application Data

(60) Provisional application No. 62/121,930, filed on Feb. 27, 2015, provisional application No. 62/121,973, filed on Feb. 27, 2015.

(51) Int. Cl.
*F02B 37/00* (2006.01)
*F02B 37/013* (2006.01)
(Continued)

(52) U.S. Cl.
CPC .......... *F02B 37/013* (2013.01); *F02B 37/001* (2013.01); *F02B 37/004* (2013.01);
(Continued)

(58) Field of Classification Search
CPC .... F02B 37/001; F02B 37/004; F02B 37/013; F02B 37/18; F02B 41/10; Y02T 10/144; Y02T 10/163
See application file for complete search history.

(56) References Cited

U.S. PATENT DOCUMENTS 2,173,595 A 9/1939 Schutte
3,007,302 A * 11/1961 Vincent .................. F02B 41/10
60/598
(Continued)

FOREIGN PATENT DOCUMENTS

DE 4429855 C1 8/1995
DE 102005003714 A1 8/2006
(Continued)

OTHER PUBLICATIONS

European Office Action for Application No. 16157548.5 dated Mar. 7, 2017.
(Continued)

*Primary Examiner* — Brandon Lee
(74) *Attorney, Agent, or Firm* — Harness, Dickey & Pierce, P.L.C.

(57) ABSTRACT

A turbo-compounding system may include a first turbine, a turbocharger, a bypass passageway and a valve. The first turbine may include an inlet in fluid communication with an exhaust manifold and an outlet in fluid communication with a fluid passageway. The first turbine may be drivingly coupled to an engine. The turbocharger includes a first compressor and a second turbine. The first compressor receives an intake fluid at a first pressure and discharges the intake fluid at a second pressure. The second turbine may drive the first compressor and receive exhaust gas from the fluid passageway downstream of the outlet of the first turbine. The bypass passageway may include a first end fluidly coupled with the engine exhaust manifold and a second end fluidly coupled with the fluid passageway downstream from the first turbine and upstream of the second turbine. The valve controls fluid-flow through the bypass passageway.

15 Claims, 2 Drawing Sheets

Figure 1:
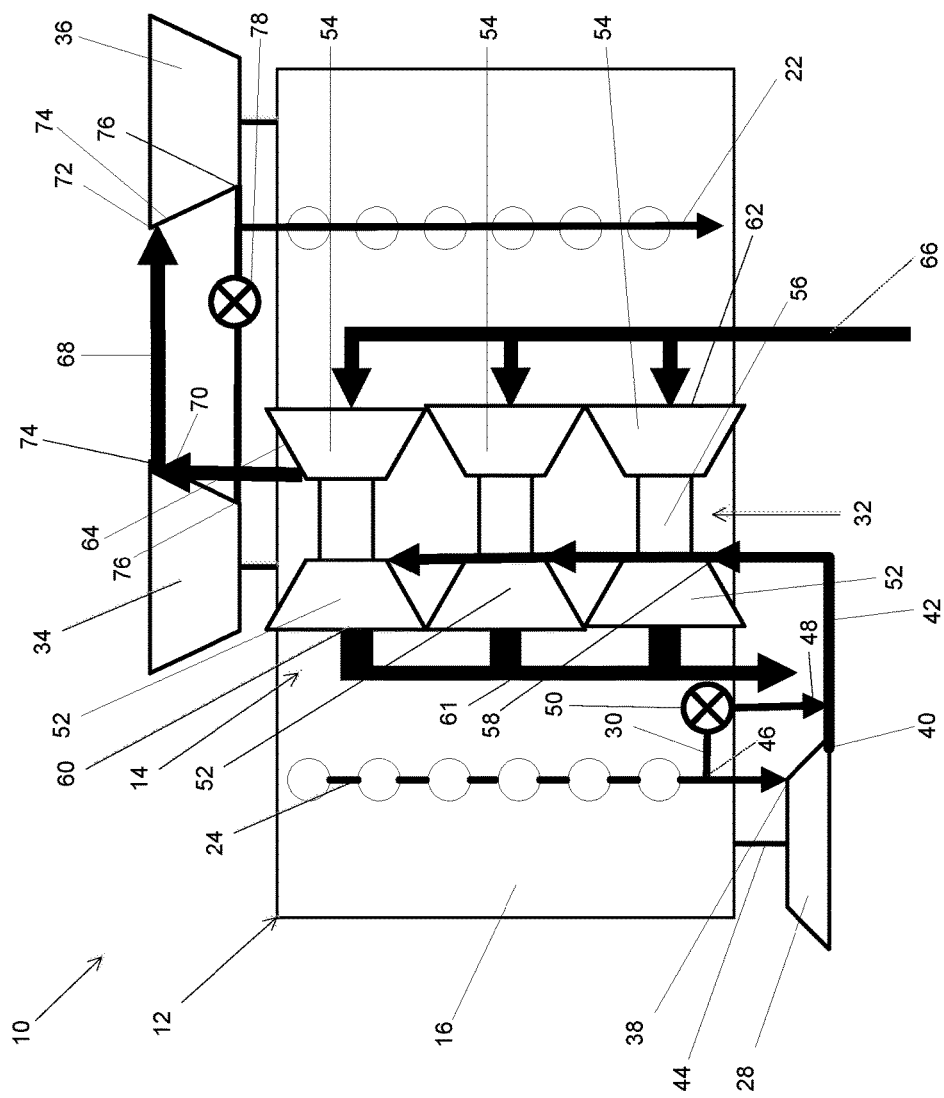

(51) Int. Cl.
*F02B 37/18* (2006.01)
*F02B 41/10* (2006.01)

(52) U.S. Cl.
CPC .............. *F02B 37/18* (2013.01); *F02B 41/10* (2013.01); *Y02T 10/144* (2013.01); *Y02T 10/163* (2013.01)

(56) References Cited

U.S. PATENT DOCUMENTS

| | | | |
|---|---|---|---|
| 3,807,168 A | 4/1974 | Bachmann | |
| 4,694,654 A * | 9/1987 | Kawamura | F02B 37/005 290/52 |
| 5,429,078 A | 7/1995 | Tanigawa et al. | |
| 5,653,108 A | 8/1997 | Hope | |
| 5,857,336 A | 1/1999 | Paul et al. | |
| 2009/0241540 A1* | 10/2009 | Robel | F02D 13/0249 60/597 |
| 2010/0011763 A1* | 1/2010 | Komatsu | F02B 37/013 60/602 |
| 2010/0095672 A1* | 4/2010 | An | F01D 17/105 60/602 |
| 2010/0199666 A1 | 8/2010 | VanDyne et al. | |
| 2012/0109491 A1* | 5/2012 | Panciroli | F02B 37/18 701/102 |
| 2012/0192559 A1 | 8/2012 | Laimboeck et al. | |
| 2014/0331656 A1 | 11/2014 | Nagar et al. | |
| 2014/0373816 A1 | 12/2014 | Nagar | |
| 2016/0252053 A1 | 9/2016 | Johnson et al. | |

FOREIGN PATENT DOCUMENTS

| | | | |
|---|---|---|---|
| DE | 102013000495 B3 | 3/2014 | |
| DE | 102013001231 A1 | 7/2014 | |
| EP | 0048027 A2 | 3/1982 | |
| GB | 479727 A | 2/1938 | |
| GB | 561428 A | 5/1944 | |
| GB | 561942 A | 6/1944 | |
| GB | 820096 A | 9/1959 | |
| GB | 2080432 A | 2/1982 | |
| WO | 2011011019 A1 | 1/2011 | |
| WO | 2013091669 A1 | 6/2013 | |
| WO | WO 2013126347 A1 * | 8/2013 | .......... F02B 29/0412 |

OTHER PUBLICATIONS

Extended European Search Report for Application No. 16157548.5 dated Jul. 29, 2016.
Extended European Search Report for Application No. 16157542.8 dated Jul. 28, 2016.

* cited by examiner

ENGINE TURBO-COMPOUNDING SYSTEM

CROSS-REFERENCE TO RELATED APPLICATIONS

This application claims the benefit of U.S. Provisional Application No. 62/121,973, filed on Feb. 27, 2015, and U.S. Provisional Application No. 62/121,930, filed on Feb. 27, 2015. Furthermore, this application is related to U.S. Application Ser. No. 15/050,847, filed on Feb. 23, 2016. The entire disclosures of the applications referenced above are incorporated herein by reference.

FIELD

The present disclosure relates to an engine turbo-compounding system.

BACKGROUND

This section provides background information related to the present disclosure and is not necessarily prior art.

A vehicle may include a turbocharger to increase the efficiency and/or power output of the vehicle's combustion engine. A turbo-compounding system having an additional turbine downstream of the turbocharger can be employed to transmit energy from engine exhaust gas to a crankshaft of the engine to further increase the fuel efficiency of the engine. While traditional turbo-compounding systems have improved engine fuel efficiency, these improvements have been limited to a relatively narrow range of engine operating conditions.

SUMMARY

This section provides a general summary of the disclosure, and is not a comprehensive disclosure of its full scope or all of its features.

In one form, the present disclosure provides a turbo-compounding system that may include a first turbine and a turbocharger. The first turbine may include an inlet in fluid communication with an engine exhaust manifold and an outlet in fluid communication with a first fluid passageway. The first turbine may be drivingly coupled to an engine. The turbocharger may include a first compressor and a second turbine. The first compressor may receive an intake fluid at a first pressure and may discharge the intake fluid at a second higher pressure. The second turbine may drive the first compressor and may receive exhaust gas from the first fluid passageway downstream of the outlet of the first turbine.

In some configurations, the turbo-compounding system includes a bypass passageway having a first end fluidly coupled with the engine exhaust manifold and a second end fluidly coupled with the first fluid passageway downstream from the first turbine and upstream of the second turbine.

In some configurations, the turbo-compounding system includes a valve may control fluid-flow through the bypass passageway.

In some configurations, the turbo-compounding system includes a second compressor driven by the engine and receiving the intake fluid from the first compressor and further compressing the intake fluid.

In some configurations, an outlet of the second compressor is fluidly coupled with an intake manifold of the engine.

In some configurations, the turbo-compounding system includes a third compressor driven by the engine and receiving the intake fluid from the first compressor and further compressing the intake fluid.

In some configurations, an outlet of the third compressor is fluidly coupled with the intake manifold of the engine.

In some configurations, the turbo-compounding system includes a control valve disposed between the intake manifold and the outlet of one of the second and third compressors.

In some configurations, the turbo-compounding system includes a plurality of turbochargers receiving exhaust gas from the first fluid passageway downstream of the outlet of the first turbine.

In some configurations, the plurality of turbochargers are arranged in parallel with each other.

In another form, the present disclosure provides a method that may include operating a combustion engine that is drivingly coupled to a first turbine; directing exhaust gas from an exhaust manifold of the combustion engine through the first turbine; directing exhaust gas downstream of the first turbine to a second turbine; driving a first compressor with the second turbine; compressing air with the first compressor; providing air compressed by the first compressor to an intake manifold of the combustion engine.

In some configurations, the method includes directing exhaust gas through a bypass passageway bypassing the first turbine. The bypass passageway may include a first end fluidly coupled with the exhaust manifold upstream from the first turbine and a second end downstream from the first turbine and upstream of the second turbine.

In some configurations, the method includes adjusting fluid-flow through the bypass passageway.

In some configurations, the method includes directing compressed air from the first compressor to a second compressor driven by the engine; and further compressing the air with the second compressor.

In some configurations, the method includes directing the further compressed air from the second compressor to the intake manifold.

In some configurations, the method includes directing the further compressed air from the second compressor to a third compressor driven by the engine; and even further compressing the air with the third compressor.

In some configurations, the method includes directing the even further compressed air from the third compressor to the intake manifold.

In some configurations, the method includes adjusting an airflow between the intake manifold and the outlet of one of the second and third compressors.

In some configurations, the method includes driving a plurality of first compressors with a plurality of second turbines receiving exhaust gas downstream of the first turbine.

In some configurations, the method includes arranging the first compressors in parallel with each other; and arranging the second turbines in parallel with each other.

Further areas of applicability will become apparent from the description provided herein. The description and specific examples in this summary are intended for purposes of illustration only and are not intended to limit the scope of the present disclosure.

DRAWINGS

The drawing described herein is for illustrative purposes only of a selected embodiment and not all possible implementations, and is not intended to limit the scope of the present disclosure.

Figure 2:
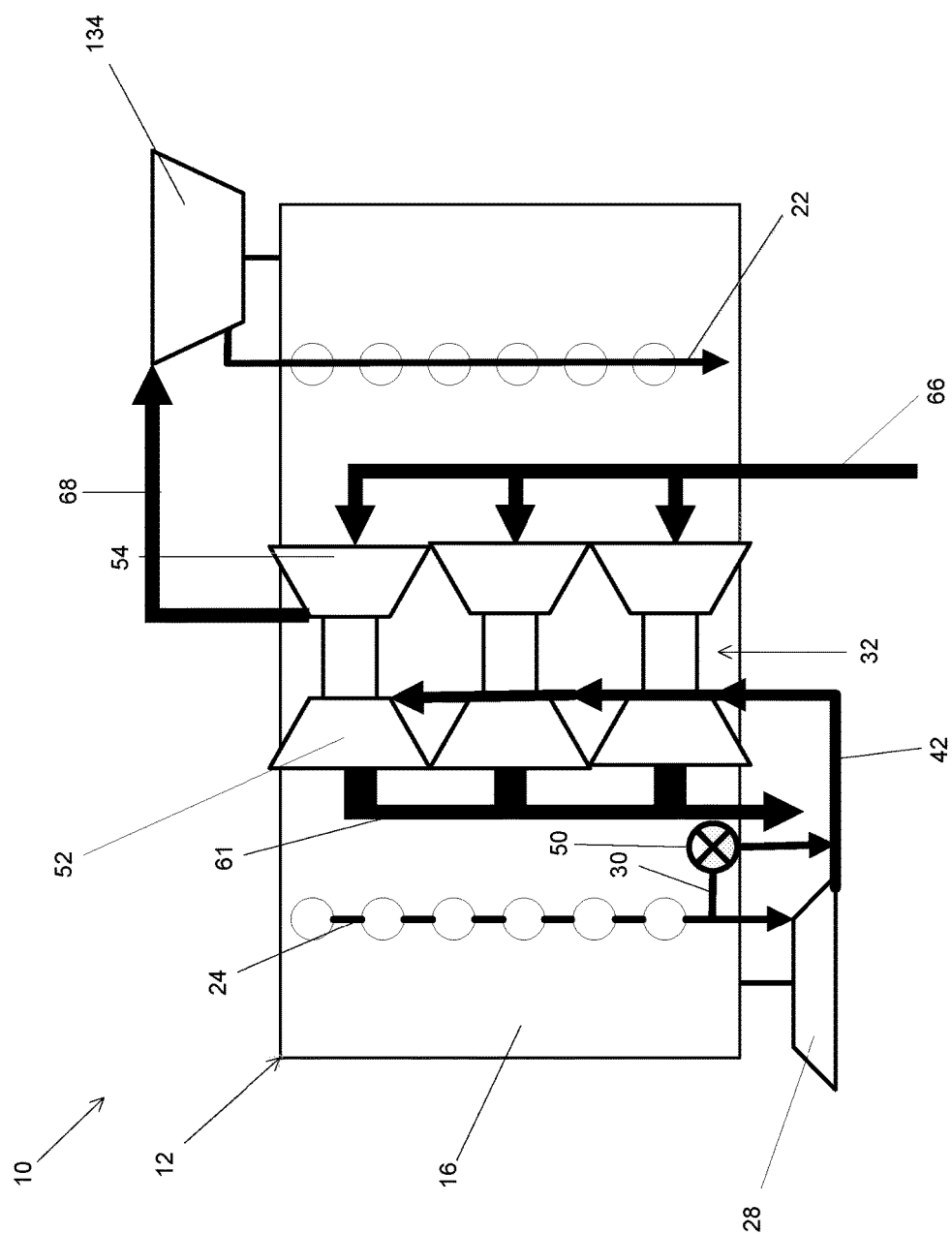

FIG. 1 is a schematic representation of an engine and a turbo-compounding system according to the principles of the present disclosure; and FIG. 2 is a schematic representation of an engine and another turbo-compounding system according to the principles of the present disclosure.

DETAILED DESCRIPTION

Example embodiments will now be described more fully with reference to the accompanying drawing.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, fourth, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figure. Spatially relative terms may be intended to encompass different orientations of the device in use or operation in addition to the orientation depicted in the figure. For example, if the device in the figure is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to the FIG. 1, a powertrain system 10 is provided and may include an engine 12 and a turbo-compounding system 14. The engine 12 may be any type of combustion engine such as a diesel engine or a spark-ignition engine, for example, and may include an engine block 16 and a crankshaft (not shown). The engine block 16 may include one or more cylinders (not shown) in which one or more pistons (not shown) reciprocate to drive the crankshaft. The cylinders may be in selective fluid communication with an intake manifold 22 and an exhaust manifold 24. The cylinders may receive air (or a mixture of air and fuel) from the intake manifold 22 for combustion in the cylinders. Exhaust gas may be discharged from the cylinders into the exhaust manifold 24. While the engine 12 is described above as being a piston-driven engine, the engine 12 could be any other type of engine, such as a Wankel engine, for example.

As shown in FIG. 1, the turbo-compounding system 14 may include a power turbine 28, a bypass passageway 30, one or more turbochargers 32, a first supercharger or scavenge blower 34, and a second supercharger or scavenge blower 36. The turbo-compounding system 14 is configured to allow for operating over a wide range of intake manifold pressure levels (e.g., about 1 to 6 atm of pressure) to accommodate a wide range of engine operating conditions.

The power turbine 28 may be a radial, axial or mixed-flow-type turbine and may include an inlet 38 in fluid communication with the exhaust manifold 24 and an outlet 40 in fluid communication with a first fluid passageway 42. The power turbine 28 may be connected to a first shaft 44 for rotation therewith. The first shaft 44 may be coupled to the crankshaft of the engine 12 via a transmission device (not shown) such that rotary power from the power turbine 28 is transmitted to the crankshaft. The transmission device may include a belt and pulleys, a chain and sprockets, a system of gears, hydraulic lines and pistons, an electric variable transmission, a clutch and/or any other device or system capable of transferring rotary power from the first shaft 44 to the crankshaft.

The bypass passageway 30 may include a first end 46 fluidly coupled to the exhaust manifold 24, a second end 48 fluidly coupled to the first fluid passageway 42, and a valve 50 disposed between the first and second ends 46, 48. The valve 50 may be movable between an open position allowing fluid-flow through the bypass passageway 30 and a closed position restricting or preventing fluid-flow through the bypass passageway 30. When the valve 50 is in the open position (or a position between a fully closed position and a fully open position), at least a portion of the exhaust gas exiting the exhaust manifold 24 may flow through the bypass passageway 30 to bypass the power turbine 28. When the valve 50 is in the closed position (or a position between the fully closed position and the fully open position), at least a portion of the exhaust gas exiting the exhaust manifold 24 may flow through the power turbine 28. Exhaust gas flowing through the bypass passageway 30 and exhaust gas exiting the power turbine 28 may recombine in the first fluid passageway 42 between the second end 48 of the bypass passageway 30 and the one or more turbochargers 32.

The valve 50 may be an electromechanical valve, such as a solenoid or step valve, for example, or a fluid-actuated valve that opens and closes in response to a pressure differential between fluid upstream and fluid downstream of the valve 50. In some configurations, a control module (not shown) may be in communication with the valve 50 and may control operation of the valve 50 based on one or more operating parameters of the engine 12 and/or the turbo-compounding system 14, for example. For example, the control module may control the valve 50 based on one or more of an exhaust manifold or power turbine inlet temperature, pressure, flow and energy, power turbine outlet temperature, pressure, flow and energy, intake manifold temperature, pressure, flow and energy, the scavenge blower (s) inlet temperature, pressure, flow and energy, throttle position, engine or exhaust temperature, engine speed, and/or engine load, for example. One or more sensors (not shown) and/or communication devices (not shown) may be provided to determine and communicate one or more of the above operating parameters to the control module.

Each of the turbochargers 32 may include a turbine 52 and a compressor 54. The turbine 52 and compressor 54 of each turbocharger 32 may be connected to each other by a second shaft 56 for rotation therewith such that rotary power is transmitted from the turbine 52 to the compressor 54. The turbines 52 can include any one or more of fixed geometry, waste-gated, or variable geometry configurations, for example. Each turbine 52 may include an inlet 58 in fluid communication with the first fluid passageway 42 and an outlet 60 in fluid communication with a second fluid passageway 61. From the turbochargers 32, exhaust gas may flow through the second fluid passageway 61 and may be discharged into the ambient atmosphere. In some configurations, exhaust gas may flow through an exhaust aftertreatment system (not shown) and/or muffler (not shown) prior to being discharged into the ambient atmosphere. It will be appreciated that the array of turbochargers 32 may consist of any number of turbochargers (including zero) operating in parallel with each other.

Each of the compressors 54 may include an inlet 62 and an outlet 64. Each inlet 62 may be in fluid communication with an air-induction duct 66, which can include a throttle valve (not shown) and an air-filtration system (not shown). Air from the air-induction duct 66 may be drawn into the compressors 54 through the inlets 62 for compression in the compressors 54. The compressed air may be discharged from the compressors 54 through the outlets 64 to a manifold 68. The manifold 68 may include first and second outlets 70, 72.

The first and second scavenge blowers 34, 36 can be centrifugal, axial or positive displacement/Roots type devices and can be driven by the crankshaft. The blowers 34, 36 can be coupled to the crankshaft by transmission devices (not shown), such as belts and pulleys, chains and sprockets, systems of gears, hydraulic lines and pistons, electric variable transmissions, clutches and/or any other devices. The first and second scavenge blowers 34, 36 each include an inlet 74 and an outlet 76. The first outlet 70 of the manifold 68 may be in fluid communication with the inlet 74 of the first scavenge blower 34. The second outlet 72 of the manifold 68 may be in fluid communication with the inlet 74 of the second scavenge blower 36. Air from the manifold 68 may be compressed in the scavenge blowers 34, 36 and may be directed into the intake manifold 22 and subsequently into the engine cylinders for combustion therein.

As shown in FIG. 1, a control valve 78 may be disposed between the intake manifold 22 and the outlet 76 of the first scavenge blower 34 to limit and/or modulate flow to the first scavenge blower 34. The flow path between the manifold 68 and the intake manifold 22 through the second scavenge blower 36 may be unrestricted (i.e., no valve is present between the outlet 76 of the second scavenge blower 36 and the intake manifold 22). In some configurations, however, the control valve 78 could be disposed between the second scavenge blower 36 and the intake manifold 22, and the flow path between the manifold 68 and the intake manifold 22 through the first scavenge blower 34 may be unrestricted.

In some configurations, the control valve 78 may be disposed between the intake manifold 22 and the outlet 76 of the first scavenge blower 34 as shown in FIG. 1, and a second control valve (not shown) may be disposed between the second scavenge blower 36 and the intake manifold 22. In other configurations, the control valve 78 may be disposed at the junction between the intake manifold 22 and the line extending between the outlet 76 of the first scavenge blower 34 and the outlet 76 of the second scavenge blower 36. In other configurations, the control valve 78 may be disposed in the intake manifold 22 just downstream of the junction between the intake manifold 22 and the line extending between the outlet 76 of the first scavenge blower 34 and the outlet 76 of the second scavenge blower 36. In any of the configurations described in this paragraph, the flow paths between the manifold 68 and the intake manifold 22 through the first and second scavenge blowers 34 and 36 may be restricted.

In some configurations, there may be more than two scavenge blowers receiving compressed air from the turbochargers 32. In such configurations, the flow path between the manifold 68 and the intake manifold 22 through at least one of the scavenge blowers may be unrestricted while the flow path between the manifold 68 and the intake manifold 22 through the remaining scavenge blowers may be limited and/or modulated by control valves. The control valve 78 may be controlled by the control module based on one or more of the operating parameters listed above.

In some configurations, when the one or more control valves 78 are in the fully closed positions, the scavenge blowers corresponding to the closed control valves 78 can be declutched or decoupled from the engine crankshaft. That is, in the configuration shown in FIG. 1, when the control valve 78 is in the fully closed position, the first scavenge blower 34 may be declutched from the engine crankshaft.

FIG. 2 depicts another configuration of the turbo-compounding system 14 having only a single scavenge blower or supercharger 134. The scavenge blower 134 may have a variable geometry or fixed geometry housing. The system 14 could include a bypass passageway (not shown) and a bypass valve (not shown). The bypass passageway can extend from the manifold 68 to the intake manifold 22 and can bypass the superchager 134. The bypass valve can be disposed in the bypass passageway and can be controlled to adjust the amount of airflow through bypass passageway and thereby control the amount of airflow through the supercharger 134.

In this application, including the definitions below, the term "module" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A turbo-compounding system comprising:
   a first turbine including an inlet in fluid communication with an engine exhaust manifold and an outlet in fluid communication with a first fluid passageway, the first turbine including a shaft that is drivingly coupled to an engine such that rotary power from the first turbine is transmitted to the engine via the shaft;
   a turbocharger including a first compressor and a second turbine, the first compressor receiving an intake fluid at a first pressure and discharging the intake fluid at a second higher pressure, the second turbine driving the first compressor and receiving exhaust gas from the first fluid passageway downstream of the outlet of the first turbine;
   a bypass passageway including a first end fluidly coupled with the engine exhaust manifold and a second end fluidly coupled with the first fluid passageway downstream from the first turbine and upstream of the second turbine; and
   a second compressor receiving the intake fluid from the first compressor and further compressing the intake fluid, wherein the second compressor is a crankshaft-driven compressor,
   wherein the first fluid passageway extends from the outlet of the first turbine to an inlet of the second turbine.

2. The turbo-compounding system of claim 1, further comprising a valve controlling fluid-flow through the bypass passageway.

3. The turbo-compounding system of claim 1, wherein an outlet of the second compressor is fluidly coupled with an intake manifold of the engine.

4. The turbo-compounding system of claim 3, further comprising a third compressor receiving the intake fluid from the first compressor and further compressing the intake fluid, wherein the third compressor is a crankshaft-driven compressor.

5. The turbo-compounding system of claim 4, wherein an outlet of the third compressor is fluidly coupled with the intake manifold of the engine.

6. The turbo-compounding system of claim 5, further comprising a control valve disposed between the intake manifold and the outlet of one of the second and third compressors.

7. The turbo-compounding system of claim 1, further comprising a plurality of turbochargers receiving exhaust gas from the first fluid passageway downstream of the outlet of the first turbine.

8. The turbo-compounding system of claim 7, wherein the plurality of turbochargers are arranged in parallel with each other.

9. A method comprising:
   operating a combustion engine that is drivingly coupled to a shaft of a first turbine such that rotary power from the first turbine is transmitted to the combustion engine via the shaft;
   directing exhaust gas from an exhaust manifold of the combustion engine through the first turbine;
   directing exhaust gas downstream of the first turbine to a second turbine;
   driving a first compressor with the second turbine;
   compressing air with the first compressor;
   providing air compressed by the first compressor to an intake manifold of the combustion engine;
   directing exhaust gas through a bypass passageway bypassing the first turbine, the bypass passageway including a first end fluidly coupled with the exhaust manifold upstream from the first turbine and a second end downstream from the first turbine and upstream of the second turbine;
   adjusting fluid-flow through the bypass passageway;
   directing compressed air from the first compressor to a second compressor, wherein the second compressor is a crankshaft-driven compressor; and
   further compressing the air with the second compressor, wherein directing exhaust gas downstream of the first turbine to the second turbine includes directing exhaust gas through a first fluid passageway that extends from an outlet of the first turbine to an inlet of the second turbine, and wherein the second end of the bypass passageway is fluidly coupled with the first fluid passageway.

10. The method of claim 9, further comprising directing the further compressed air from the second compressor to the intake manifold.

11. The method of claim 10, further comprising,
   directing the further compressed air from the second compressor to a third compressor, wherein the third compressor is a crankshaft-driven compressor; and
   even further compressing the air with the third compressor.

12. The method of claim 11, further comprising directing the even further compressed air from the third compressor to the intake manifold.

13. The method of claim 12, further comprising adjusting an airflow between the intake manifold and an outlet of one of the second and third compressors.

14. The method of claim 9, further comprising driving a plurality of first compressors with a plurality of second turbines receiving exhaust gas downstream of the first turbine.

15. The method of claim 14, further comprising arranging the first compressors in parallel with each other; and arranging the second turbines in parallel with each other.

* * * * *